US011493427B2

(12) United States Patent
Lin et al.

(10) Patent No.: US 11,493,427 B2
(45) Date of Patent: Nov. 8, 2022

(54) SYSTEMS FOR CELL SORTING BASED ON FREQUENCY-ENCODED IMAGES AND METHODS OF USE THEREOF

(71) Applicant: Becton, Dickinson and Company, Franklin Lakes, NJ (US)

(72) Inventors: Jonathan Lin, San Jose, CA (US); Matthew Bahr, Fremont, CA (US); Keegan Owsley, Campbell, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 198 days.

(21) Appl. No.: 16/817,080

(22) Filed: Mar. 12, 2020

(65) Prior Publication Data

US 2020/0309671 A1 Oct. 1, 2020

Related U.S. Application Data

(60) Provisional application No. 62/824,903, filed on Mar. 27, 2019.

(51) Int. Cl.
*G06K 9/00* (2022.01)
*G01N 15/14* (2006.01)
(Continued)

(52) U.S. Cl.
CPC ....... *G01N 15/1475* (2013.01); *G01N 15/147* (2013.01); *G06T 7/11* (2017.01);
(Continued)

(58) Field of Classification Search
CPC ....... G01N 15/1475; G01N 2015/1006; G01N 1/2813; G01N 1/312; G01N 2015/0073;
(Continued)

(56) References Cited

U.S. PATENT DOCUMENTS

| 5,556,764 A | 9/1996 | Sizto et al. |
| 2006/0204071 A1* | 9/2006 | Ortyn ................. G01N 21/6458 382/133 |

(Continued)

FOREIGN PATENT DOCUMENTS

| WO | WO2017161247 A1 | 9/2017 |
| WO | WO2018231716 A2 | 12/2018 |

(Continued)

*Primary Examiner* — Alex Kok S Liew
(74) *Attorney, Agent, or Firm* — Khin K. Chin; Bret E. Field; Bozicevic, Field & Francis LLP

(57) ABSTRACT

Aspects of the present disclosure include a method for sorting cells of a sample based on an image of a cell in a flow stream. Methods according to certain embodiments include detecting light from a sample having cells in a flow stream, generating an image mask of a cell from the sample and sorting the cell based on the generated image mask. Systems having a processor with memory operably coupled to the processor having instructions stored thereon, which when executed by the processor, cause the processor to generate an image mask of a cell in a sample in a flow stream and to sort the cell based on the generated image mask are also described. Integrated circuit devices (e.g., field programmable gate arrays) having programming for generating an image mask and for determining one or more features of the cell are also provided.

19 Claims, 1 Drawing Sheet

(51) Int. Cl.
*G06T 7/66* (2017.01)
*G06T 7/70* (2017.01)
*G06T 7/136* (2017.01)
*G06T 7/11* (2017.01)
*G01N 15/10* (2006.01)

(52) U.S. Cl.
CPC .............. *G06T 7/136* (2017.01); *G06T 7/66* (2017.01); *G06T 7/70* (2017.01); *G01N 2015/1006* (2013.01); *G01N 2015/149* (2013.01); *G06T 2207/10064* (2013.01); *G06T 2207/30024* (2013.01)

(58) Field of Classification Search
CPC ..... G01N 2015/008; G01N 2015/0084; G01N 2015/1486; G01N 35/00029; G01N 2015/1472; G01N 2015/1497; G01N 2035/00138; G01N 2035/00465; G01N 2035/0091; G01N 21/25; G01N 21/255; G01N 2201/062; G01N 2201/126; G01N 2333/805; G01N 33/49; G01N 35/00871; G01N 35/1016; G01N 15/14; G01N 15/1456; G01N 15/147; G01N 2015/1062; G01N 2021/4707; G01N 2021/4711; G01N 33/5094
See application file for complete search history.

(56) References Cited

U.S. PATENT DOCUMENTS

| | | |
|---|---|---|
| 2012/0148142 A1 | 6/2012 | Ortyn et al. |
| 2013/0051651 A1* | 2/2013 | Leary .................... G06T 7/0012 |
| | | 382/133 |
| 2013/0114874 A1 | 5/2013 | Kask |
| 2013/0244906 A1* | 9/2013 | Collins ............. B01L 3/502761 |
| | | 506/12 |
| 2013/0279789 A1 | 10/2013 | Elter et al. |

FOREIGN PATENT DOCUMENTS

| | | |
|---|---|---|
| WO | WO2019209977 A1 | 10/2019 |
| WO | WO2020047468 A1 | 3/2020 |
| WO | WO2020081292 A1 | 4/2020 |

\* cited by examiner

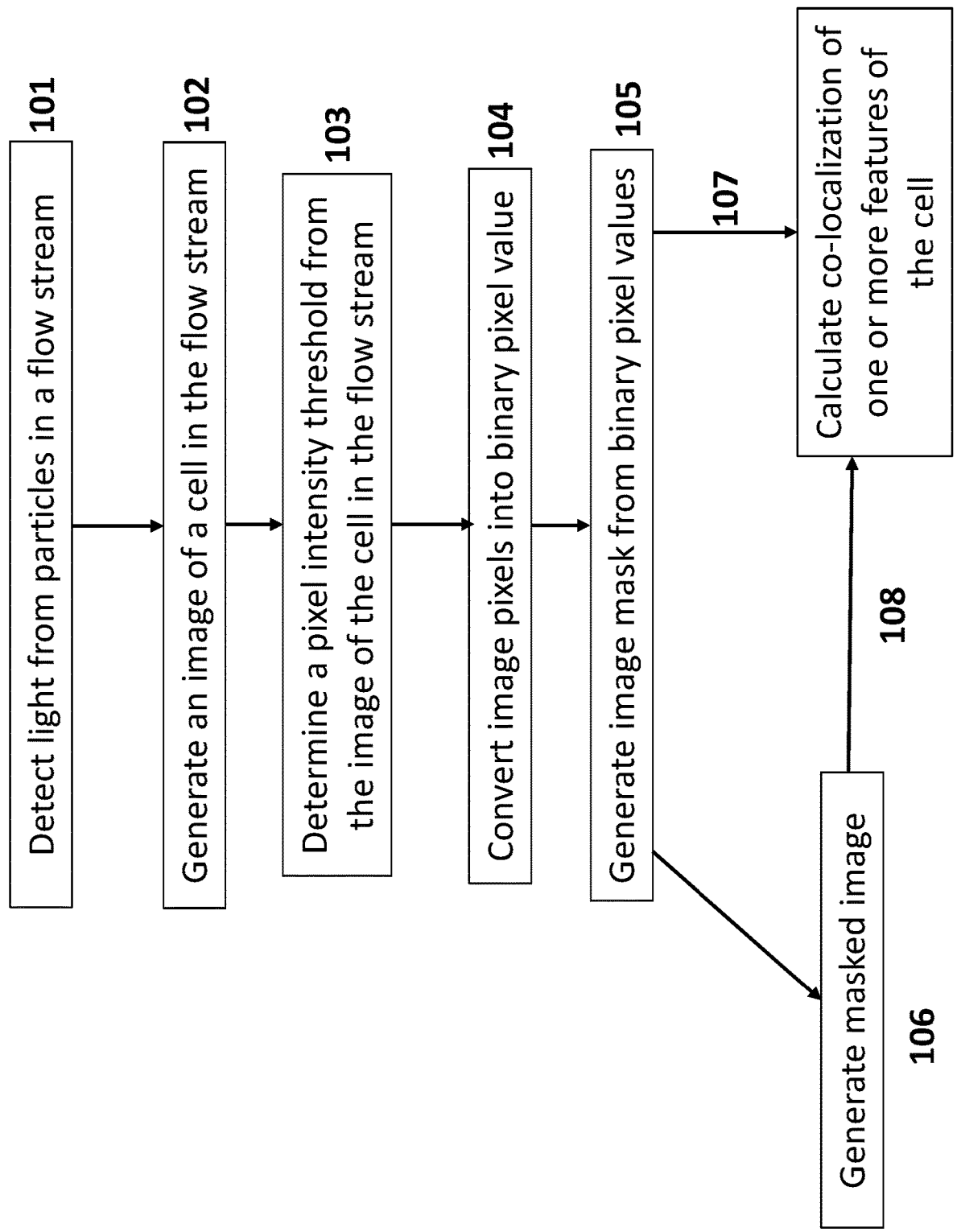

SYSTEMS FOR CELL SORTING BASED ON FREQUENCY-ENCODED IMAGES AND METHODS OF USE THEREOF

CROSS-REFERENCE TO RELATED APPLICATION

This application is related to U.S. Provisional Patent Application Ser. No. 62/824,903 filed Mar. 27, 2019; the disclosure of which application is herein incorporated by reference.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cells, in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest.

Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

To sort particles in the sample, a drop charging mechanism charges droplets of the flow stream containing a particle type to be sorted with an electrical charge at the break-off point of the flow stream. Droplets are passed through an electrostatic field and are deflected based on polarity and magnitude of charge on the droplet into one or more collection containers. Uncharged droplets are not deflected by the electrostatic field.

SUMMARY

Aspects of the present disclosure include a method for sorting cells of a sample based on an image of a cell in a flow stream. Methods according to certain embodiments include detecting light from a sample having cells in a flow stream, generating an image mask of a cell from the sample and sorting the cell based on the generated image mask. Systems having a processor with memory operably coupled to the processor having instructions stored thereon, which when executed by the processor, cause the processor to generate an image mask of a cell in a sample in a flow stream and to sort the cell based on the generated image mask are also described. Integrated circuit devices (e.g., field programmable gate arrays) having programming for generating an image mask and for determining one or more features of the cell are also provided.

Cells from a sample in a flow stream are sorted based on generated images (e.g., frequency-encoded images) of the cells in the flow stream. Cells in the flow stream are imaged by detecting light from the sample. In some embodiments, methods include detecting one or more of light absorption, light scatter, light emission (e.g., fluorescence) from the sample in the flow stream. In some instances, an image of one or more cells in the sample is generated from detected light absorption (e.g., brightfield image data). In other instances, an image of one or more cells in the sample is generated from detected light scatter (e.g., forward scatter image data, side scatter image data). In yet other instances, an image of one or more cells in the sample are generated from detected fluorescence (e.g., fluorescent marker image data). In still other instances, an image of one or more cells in the sample is generated from a combination of two or more of detected light absorption, detected light scatter and detected fluorescence.

In embodiments, methods include generating an image mask of a cell in the flow stream. In some instances, generating an image mask includes generating a greyscale image of the cell in the flow stream. In these instances, methods include determining a pixel intensity threshold value from the greyscale image. To determine the pixel intensity threshold value, one method includes minimizing the intra-class variance of the greyscale image and calculating a pixel intensity threshold value based on the minimized intra-class variance. In some embodiments, generating an image mask includes comparing the intensity of each pixel from the greyscale image against the determined pixel intensity threshold value and converting each pixel in the greyscale image to a binary pixel value. In some instances, generating an image mask includes comparing across a horizontal row each pixel intensity value of the greyscale image against the determined threshold value. In one example, methods include detecting light absorption (e.g., brightfield image data) from the flow stream and assigning a pixel value of 1 to each pixel in the greyscale image when the pixel intensity is less than the threshold value and assigning a pixel value of 0 when the pixel intensity of the greyscale image is greater than the threshold value. In another example, methods include detecting light scatter from the cell in the flow stream and assigning a pixel value of 1 to each pixel in the greyscale image when the pixel intensity is greater than the threshold value and assigning a pixel value of 0 when the pixel intensity is less than the threshold value. In yet another example, methods include detecting fluorescence from the cell in the flow stream and assigning a pixel value of 1 to each pixel in the greyscale image when the pixel intensity is greater than the threshold value and assigning a pixel value of 0 when the pixel intensity is less than the threshold value. In these examples, method may also include determining across a horizontal row of the greyscale image a first pixel and a second pixel having an assigned pixel value of 1. The first pixel is, in some instances, the first pixel across the horizontal row having a pixel value of 1. In these instances, the second pixel is the last pixel across the horizontal row having a pixel value of 1. In other instances, the first pixel is the first pixel across the horizontal row having a pixel value of 0 and the second pixel is the last pixel across the horizontal row having a pixel value of 0. In some embodiments, the image mask is generated from the pixels having a binary pixel value of 1. In other embodiments, the image mask is generated from the pixels having a binary pixel value of 0.

Methods according to certain embodiments include determining one or more properties of the cell in the flow stream based on the generated image mask. For example, methods may include determining the size of the cell, the center of mass of the cell or the eccentricity of the cell based on the image mask. In some embodiments, methods include generating a second image mask of the cell and comparing the first image mask with the second image mask, such as for example to determine whether the image of the cell includes a doublet.

In some embodiments, methods include calculating an image moment from the image mask. For example, an image moment may be calculated from the image mask according to:

$$M_{m,n} = \Sigma(x-\bar{x})^m (y-\bar{y})^n \, \text{Im}(x,y) = M \cdot \text{Im}(x,y)$$

where m is the image moment computed along the x-axis of the image mask; and n is the image moment computed along the y-axis of the image mask.

In some instances, the center of mass may be calculated from the image moment of the image mask. For example, the center of mass may be calculated from the image moment of the image mask according to:

$$\text{Center of Mass} = \frac{M_{1,0}}{M_{0,0}}$$

In other instances, the orientation of the cell may be calculated from the image moment of the image mask. For example, the orientation of the cell may be calculated from the image moment of the image mask according to:

$$\text{Orientation of cell} = \frac{1}{2}\arctan \frac{2\left(M_{1,1} - \frac{M_{1,0}M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In still other instances, the eccentricity of the cell may be calculated from the image moment of the image mask. For example, the eccentricity of the cell may be calculated from the image moment of the image mask according to:

$$\text{Eccentricity} = \frac{M_{2,0} - \frac{M_{2,0}^2}{M_{0,0}^2} + M_{0,2} - \frac{M_{0,2}^2}{M_{0,0}^2} - \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{0,2}^2}{M_{0,0}^2} + \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In certain embodiments, methods further include generating a masked image of the cell by multiplying each pixel value from the image with each pixel value from the image mask. In some instances, method include calculating an image moment from the masked image according to:

$$M_{m,n} = \Sigma(x-\bar{x})^m (y-\bar{y})^n \, \text{Im}(x,y) = M \cdot \text{Im}(x,y)$$

where m is the image moment computed along the x-axis of the masked image; and n is the image moment computed along the y-axis of the masked image.

In other instances, the center of mass may be calculated from an image moment of the masked image. For example, the center of mass may be calculated from the image moment of the masked image according to:

$$\text{Center of Mass} = \frac{M_{1,0}}{M_{0,0}}$$

In still other instances, the orientation of the cell may be calculated from an image moment of the masked image. For example, the orientation of the cell may be calculated from the image moment of the masked image according to:

$$\text{Orientation of cell} = \frac{1}{2}\arctan \frac{2\left(M_{1,1} - \frac{M_{1,0}M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In yet other instances, the eccentricity of the cell may be calculated from an image moment of the masked image. For example, the eccentricity of the cell may be calculated from the image moment of the masked image according to:

$$\text{Eccentricity} = \frac{M_{2,0} - \frac{M_{2,0}^2}{M_{0,0}^2} + M_{0,2} - \frac{M_{0,2}^2}{M_{0,0}^2} - \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{0,2}^2}{M_{0,0}^2} + \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In some embodiments, methods include comparing for each cell, two or more of the image, the image mask and the masked image. In other embodiments, methods include generating and comparing two or more different image masks of the cell, two or more different images of the cell or two or more different masked images of the cell. In these embodiments, methods may further include calculating a co-localization coefficient (i.e., degree of colocalization) for one or more features of the cell in the image mask, image or masked image. In embodiments, a feature of the cell may be an intracellular organelle (e.g., nucleus, mitochondria) or an intracellular macromolecule (e.g., protein, nucleic acid). In one example, a co-localization coefficient is calculated for a feature of the cell using two or more different image masks of the cell. In another example, a co-localization coefficient is calculated for a feature of the cell using two or more different images of the cell. In yet another example, a co-localization coefficient is calculated for a feature of the cell using two or more different masked images of the cell. In still another example, a co-localization coefficient is calculated for a feature of the cell using a combination of two or more of an image mask, an image and masked image of the cell.

In certain embodiments, the co-localization coefficient for the feature of the cell is calculated according to:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

where x is an image pixel for a first image, a first image mask or a first masked image; y is an image pixel for a second image, a second image mask or a second masked image; $\bar{x}$ is average pixel value for the first image, the first image mask or the first masked image; and $\bar{y}$ is average pixel value for the second image, the second image mask or the second masked image.

In other embodiments, the co-localization coefficient for the feature of the cell is calculated according to:

$$r = \frac{\sum_{i=1}^{n}(x_i y_i) - n\bar{x}\bar{y}}{\sqrt{\sum_{i=1}^{n}(x_i^2) - n\bar{x}^2}\sqrt{\sum_{i=1}^{n}(y_i^2) - n\bar{y}^2}}$$

In still other embodiments, the co-localization coefficient for the feature of the cell is calculated according to:

$$\log r = \log(\Sigma_{i=1}^{n}(x_i y_i) - n\bar{x}\bar{y}) - 0.5*\log(\Sigma_{i=1}^{n}(x_i^2) - n\bar{x}^2) - 0.5*\log(\Sigma_{i=1}^{n}(y_i^2) - n\bar{y}^2)$$

Aspects of the present disclosure also include systems for sorting cells of a sample in a flow stream. Systems according to certain embodiments include a light source configured to irradiate a sample having cells in a flow stream, a light detection system having a photodetector and a processor having memory operably coupled to the processor such that the memory includes instructions stored thereon, which when executed by the processor, cause the processor to generate an image mask of a cell in the flow stream and a cell sorting component that is configured to sort cells in the sample based on the generated image mask. In embodiments, the light detection system includes one or more photodetectors for detecting light absorption, light scatter, fluorescence or a combination thereof.

In embodiments, systems include a processor with memory operably coupled to the processor such that the memory includes instructions stored thereon, which when executed by the processor, cause the processor to generate an image mask of a cell in the flow stream. In some embodiments, the memory includes instructions for generating a greyscale image of the cell in the flow stream. In these embodiments, the memory includes instructions which when executed by the processor cause the processor to determine a pixel intensity threshold value from the greyscale image. In some instances, the memory includes instructions for comparing each pixel from the greyscale image against the determined threshold value and converting each pixel to a binary pixel value. For example, the memory may include instructions for comparing across a horizontal row each pixel intensity value of the greyscale image against the determined threshold value.

In one example, the memory includes instructions which when executed by the processor, cause the processor to detect light absorption from the flow stream and assign a pixel value of 1 to each pixel of the greyscale image when the pixel intensity is less than the threshold value and assign a pixel value of 0 when the pixel intensity is greater than the threshold value. In another example, the memory includes instructions which when executed by the processor, cause the processor to detect light scatter from the cell in the flow stream and assign a pixel value of 1 to each pixel in the greyscale image when the pixel intensity is greater than the threshold value and assign a pixel value of 0 when the pixel intensity is less than the threshold value. In yet another example, the memory includes instructions which when executed by the processor, cause the processor to detect fluorescence from the cell in the flow stream and assign a pixel value of 1 to each pixel in the greyscale image when the pixel intensity is greater than the threshold value and assign a pixel value of 0 when the pixel intensity is less than the threshold value. In these examples, the memory may also include instructions which when executed by the processor, cause the processor to determine across a horizontal row of the greyscale image a first pixel and a second pixel having an assigned pixel value of 1. The first pixel is, in some instances, the first pixel across the horizontal row having a pixel value of 1. In these instances, the second pixel is the last pixel across the horizontal row having a pixel value of 1. In other instances, the first pixel is the first pixel across the horizontal row having a pixel value of 0 and the second pixel is the last pixel across the horizontal row having a pixel value of 0. In some embodiments, the image mask is generated from the pixels having a binary pixel value of 1. In other embodiments, the image mask is generated from the pixels having a binary pixel value of 0.

Systems of interest may also include memory having instructions which when executed by the processor, cause the processor to determine one or more properties of the cell in the flow stream based on the image mask. In these embodiments, the memory may include instructions for determining the size of the cell, the center of mass of the cell or the eccentricity of the cell based on the image mask. In certain instances, the memory includes instructions for generating a second image mask of the cell and comparing the first image mask with the second image mask. In certain instances, the memory includes instructions for determining the presence of a doublet (i.e., cell aggregate) based on the first image mask and second image mask.

In certain embodiments, systems include a processor with memory operably coupled to the processor such that the memory includes instructions stored thereon, which when executed by the processor, cause the processor to calculate an image moment from the image mask. In certain instances, the image moment is calculated from the image mask according to:

$$M_{m,n} = \Sigma(x-\bar{x})^m(y-\bar{y})^n \operatorname{Im}(x,y) = M \cdot \operatorname{Im}(x,y)$$

where m is the image moment computed along the x-axis of the image mask and n is the image moment computed along the y-axis of the image mask.

In some embodiments, the memory includes instructions for calculating the center of mass from the image moment of the image mask. For example, the memory may include instructions for calculating the center of mass of the cell from the image moment of the image mask according to:

$$\text{Center of Mass} = \frac{M_{1,0}}{M_{0,0}}$$

In other embodiments, the memory includes instructions for calculating the orientation of the cell from the image moment of the image mask. For example, the memory may include instructions for calculating the orientation of the cell from the image moment of the image mask according to:

$$\text{Orientation of cell} = \frac{1}{2}\arctan\frac{2\left(M_{1,1} - \frac{M_{1,0}M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In yet other embodiments, the memory includes instructions for calculating the eccentricity of the cell from the image moment of the image mask. For example, the memory may include instructions for calculating the eccentricity of the cell from the image moment of the image mask according to:

$$\text{Eccentricity} = \frac{M_{2,0} - \frac{M_{2,0}^2}{M_{0,0}^2} + M_{0,2} - \frac{M_{0,2}^2}{M_{0,0}^2} - \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{0,2}^2}{M_{0,0}^2} + \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In certain embodiments, systems include a processor with memory operably coupled to the processor such that the memory includes instructions stored thereon, which when executed by the processor, cause the processor to generate a masked image of the cell by multiplying each pixel value from the image with each pixel value from the image mask. In some instances, the memory further includes instructions for calculating an image moment from the masked image according to:

$$M_{m,n} = \Sigma(x-\bar{x})^m (y-\bar{y})^n \, \text{Im}(x,y) = M \cdot \text{Im}(x,y)$$

where m is the image moment computed along the x-axis of the masked image; and n is the image moment computed along the y-axis of the masked image.

In some embodiments, the memory includes instructions for calculating the center of mass from an image moment of the masked image. For example, the memory may include instructions for calculating the center of mass of the cell from the image moment of the masked image according to:

$$\text{Center of Mass} = \frac{M_{1,0}}{M_{0,0}}$$

In other embodiments, the memory includes instructions for calculating the orientation of the cell from an image moment of the masked image. For example, the memory may include instructions for calculating the orientation of the cell from the image moment of the masked image according to:

$$\text{Orientation of cell} = \frac{1}{2}\arctan\frac{2\left(M_{1,1} - \frac{M_{1,0}M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In yet other embodiments, the memory includes instructions for calculating the eccentricity of the cell from an image moment of the masked image. For example, the memory may include instructions for calculating the eccentricity of the cell from the image moment of the masked image according to:

$$\text{Eccentricity} = \frac{M_{2,0} - \frac{M_{2,0}^2}{M_{0,0}^2} + M_{0,2} - \frac{M_{0,2}^2}{M_{0,0}^2} - \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{0,2}^2}{M_{0,0}^2} + \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

The subject systems may be configured to generate two or more of an image mask, an image or a masked image for each cell. In some instances, systems are configured to generate two or more different image masks of the cell, two or more different images of the cell or two or more different masked images of the cell.

In some embodiments, the memory may further include instructions for calculating a co-localization coefficient (i.e., degree of colocalization) of one or more features of the cell in the image mask, image or masked image. In one example, the memory includes instructions for calculating a co-localization coefficient for a feature of the cell using two or more different image masks of the cell. In another example, the memory includes instructions for calculating a co-localization coefficient for a feature of the cell using two or more different images of the cell. In yet another example, the memory includes instructions for calculating a co-localization coefficient for a feature of the cell using two or more different masked images of the cell. In still another example, the memory includes instructions for calculating a co-localization coefficient for a feature of the cell using a combination of two or more of an image mask, an image and masked image of the cell.

In some instances, the memory includes instructions which when executed by the processor cause the processor to calculate the co-localization coefficient for the feature of the cell according to $$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

where x is an image pixel for a first image, a first image mask or a first masked image; y is an image pixel for a second image, a second image mask or a second masked image; $\bar{x}$ is average pixel value for the first image, the first image mask or the first masked image; and $\bar{y}$ is average pixel value for the second image, the second image mask or the second masked image. In other instances, the memory includes instructions for calculating the co-localization coefficient for the feature of the cell according to:

$$r = \frac{\sum_{i=1}^{n}(x_i y_i) - n\bar{x}\bar{y}}{\sqrt{\sum_{i=1}^{n}(x_i^2) - n\bar{x}^2}\sqrt{\sum_{i=1}^{n}(y_i^2) - n\bar{y}^2}}$$

In yet other instances, the memory includes instructions for calculating the co-localization coefficient for the feature of the cell according to:

$$\log r = \log(\Sigma_{i=1}^n (x_i y_i) - n\overline{xy}) - 0.5 \cdot \log(\Sigma_{i=1}^n (x_i^2) - n\overline{x}^2) - 0.5 \cdot \log(\Sigma_{i=1}^n (y_i^2) - n\overline{y}^2)$$

Aspects of the present disclosure also include integrated circuit devices programmed to: generate an image mask of a cell in a flow stream detected by a light detection system having a photodetector; and sort the cell based on the generated image mask. Integrated circuit devices of interest may include, in certain instances, a field programmable gate array (FPGA), an application specific integrated circuit (ASIC) or a complex programmable logic device (CPLD).

Integrated circuit devices according to certain embodiments are programmed to generate a greyscale image of the cell in the flow stream. In some embodiments, the integrated circuit device is programmed to determine a pixel intensity threshold value from the greyscale image. In certain instances, the integrated circuit device is programmed to compare each pixel from the greyscale image against the determined threshold value and convert each pixel to a binary pixel value. In some embodiments, the integrated circuit device is programmed to assign a pixel value of 1 to each pixel of the greyscale image when the pixel intensity is less than the threshold value and assigning a pixel value of 0 when the pixel intensity is greater than the threshold value. In other embodiments, the integrated circuit is programmed to assign a pixel value of 1 to each pixel of the greyscale image when the pixel intensity is greater than the threshold value and assigning a pixel value of 0 when the pixel intensity is less than the threshold value. In certain instances, the integrated circuit is programmed to determine across a horizontal row of the greyscale image a first pixel and a second pixel having an assigned pixel value of 1.

In some instances, the integrated circuit device is programmed to determine across a horizontal row of the greyscale image a first pixel and a second pixel having an assigned pixel value of 1. The first pixel is, in some instances, the first pixel across the horizontal row having a pixel value of 1. In these instances, the second pixel is the last pixel across the horizontal row having a pixel value of 1. In other instances, the integrated circuit device is programmed to determine across a horizontal row of the greyscale image a first pixel and a second pixel having an assigned pixel value of 0. In these instances, the first pixel is the first pixel across the horizontal row having a pixel value of 0 and the second pixel is the last pixel across the horizontal row having a pixel value of 0. In some embodiments, the image mask is generated by the integrated circuit device from the pixels having a binary pixel value of 1. In other embodiments, the image mask is generated by the integrated circuit device from the pixels having a binary pixel value of 0.

In some embodiments, the integrated circuit device is programmed to determine the size of the cell based on the image mask. In other embodiments, integrated circuit device is programmed to determine the center of mass of the cell based on the image mask. In still other embodiments, the integrated circuit device is programmed to determine the eccentricity of the cell based on the image mask.

The integrated circuit device may be programmed to generate a second image mask of the cell. In these embodiments, the integrated circuit device may be programmed to compare the first image mask with the second image mask of the cell. For example, comparing the first image mask with the second image mask may include determining that the image mask of the cell includes a doublet.

In some instances, the integrated circuit device is programmed to calculate an image moment from the image mask. For example, the integrated circuit device may be programmed to calculate the image mask according to:

$$M_{m,n} = \Sigma (x-\overline{x})^m (y-\overline{y})^n \operatorname{Im}(x,y) = M \cdot \operatorname{Im}(x,y)$$

where m is the image moment computed along the x-axis of the image mask and n is the image moment computed along the y-axis of the image mask.

The image moment may be used to calculate the center of mass of the cell. In these embodiments, the integrated circuit device may be programmed to calculate the center of mass of the cell from an image moment of the image mask according to:

$$\text{Center of Mass} = \frac{M_{1,0}}{M_{0,0}}$$

The image moment may be used to calculate the orientation of the cell from an image moment. In these embodiments, the integrated circuit device may be programmed to calculate the orientation of the cell from the image moment according to:

$$\text{Orientation of cell} = \frac{1}{2}\arctan \frac{2\left(M_{1,1} - \frac{M_{1,0} M_{0,1}}{M_{0,0}}\right)}{M_{2,0} - \frac{M_{2,0}^2}{M_{0,0}} - M_{0,2} + \frac{M_{0,2}^2}{M_{0,0}}}$$

The image moment may be used to calculate the eccentricity of the cell from an image moment. In these embodiments, the integrated circuit may be programmed to calculate the eccentricity of the cell from the image moment according to:

$$\text{Eccentricity} = \frac{M_{2,0} - \frac{M_{2,0}^2}{M_{0,0}^2} + M_{0,2} - \frac{M_{2,0}^2}{M_{0,0}^2} - \sqrt{4\left(M_{1,1} - \frac{M_{1,0} M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{2,0}^2}{M_{0,0}^2} + \sqrt{4\left(M_{1,1} - \frac{M_{1,0} M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In certain embodiments, integrated circuit devices of interest are programmed to generate a masked image of the cell by multiplying each pixel value from the image with each pixel value from the image mask. In some instances, the integrated circuit device is programmed to calculate an image moment from the masked image according to:

$$M_{m,n} = \Sigma (x-\overline{x})^m (y-\overline{y})^n \operatorname{Im}(x,y) = M \cdot \operatorname{Im}(x,y)$$

where m is the image moment computed along the x-axis of the masked image; and n is the image moment computed along the y-axis of the masked image.

In some embodiments, the integrated circuit device is programmed to calculate the center of mass from an image moment of the masked image. For example, the integrated circuit device is programmed to calculate the center of mass of the cell from the image moment of the masked image according to:

$$\text{Center of Mass} = \frac{M_{1,0}}{M_{0,0}}$$

In other embodiments, the integrated circuit device is programmed to calculate the orientation of the cell from an image moment of the masked image. For example, the integrated circuit device is programmed to calculate the orientation of the cell from the image moment of the masked image according to:

$$\text{Orientation of cell} = \frac{1}{2}\arctan\frac{2\left(M_{1,1} - \frac{M_{1,0}M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In yet other embodiments, the integrated circuit device is programmed to calculate the eccentricity of the cell from an image moment of the masked image. For example, the integrated circuit device is programmed to calculate the eccentricity of the cell from the image moment of the masked image according to:

$$\text{Eccentricity} = \frac{M_{2,0} - \frac{M_{2,0}^2}{M_{0,0}^2} + M_{0,2} - \frac{M_{2,0}^2}{M_{0,0}^2} - \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{2,0}^2}{M_{0,0}^2} + \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

The subject integrated circuit devices may be programmed to generate two or more of an image mask, an image or a masked image for each cell. In some instances, the integrated circuit device is programmed to generate two or more different image masks of the cell, two or more different images of the cell or two or more different masked images of the cell.

In some embodiments, the integrated circuit device is programmed to calculate a co-localization coefficient of one or more features of the cell in the image mask, image or masked image. In one example, the integrated circuit device is programmed to calculate a co-localization coefficient for a feature of the cell using two or more different image masks of the cell. In another example, the integrated circuit device is programmed to calculate a co-localization coefficient for a feature of the cell using two or more different images of the cell. In yet another example, the integrated circuit device is programmed to calculate a co-localization coefficient for a feature of the cell using two or more different masked images of the cell. In still another example, the integrated circuit device is programmed to calculate a co-localization coefficient for a feature of the cell using a combination of two or more of an image mask, an image and masked image of the cell.

In some instances, the integrated circuit device is programmed to calculate the co-localization coefficient for the feature of the cell according to $$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

where x is an image pixel for a first image, a first image mask or a first masked image; y is an image pixel for a second image, a second image mask or a second masked image; $\bar{x}$ is average pixel value for the first image, the first image mask or the first masked image; and $\bar{y}$ is average pixel value for the second image, the second image mask or the second masked image.

In other instances, the integrated circuit device is programmed to calculate the co-localization coefficient for the feature of the cell according to:

$$r = \frac{\sum_{i=1}^{n}(x_i y_i) - n\bar{x}\bar{y}}{\sqrt{\sum_{i=1}^{n}(x_i^2) - n\bar{x}^2}\sqrt{\sum_{i=1}^{n}(y_i^2) - n\bar{y}^2}}$$

In yet other instances, the integrated circuit device is programmed to calculate the co-localization coefficient for the feature of the cell according to:

$$\log r = \log(\Sigma_{i=1}^{n}(x_i y_i) - n\bar{x}\bar{y}) - 0.5*\log(\Sigma_{i=1}^{n}(x_i^2) - n\bar{x}^2) - 0.5*\log(\Sigma_{i=1}^{n}(y_i^2) - n\bar{y}^2)$$

BRIEF DESCRIPTION OF THE FIGURE

The invention may be best understood from the following detailed description when read in conjunction with the accompanying drawing.

FIG. 1 depicts a flow chart for imaging and characterizing a cell in a flow stream according to certain embodiments.

DETAILED DESCRIPTION

Aspects of the present disclosure include a method for sorting cells of a sample based on an image of a cell in a flow stream. Methods according to certain embodiments include detecting light from a sample having cells in a flow stream, generating an image mask of a cell from the sample and sorting the cell based on the generated image mask. Systems having a processor with memory operably coupled to the processor having instructions stored thereon, which when executed by the processor, cause the processor to generate an image mask of a cell in a sample in a flow stream and to sort the cell based on the generated image mask are also described. Integrated circuit devices (e.g., field programmable gate arrays) having programming for generating an image mask and for determining one or more features of the cell are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides systems and methods for sorting particle components of a sample, such as cells in a biological sample. In further describing embodiments of the disclosure, methods for generating an image mask of a cell in a flow stream and sorting the cell based on the generated image mask are first described in greater detail. Next, systems for characterizing and separating particles in a sample in real time are described. Integrated circuit devices, such as field programmable gate arrays having programming for generating an image mask of a cell, characterizing the cell and sorting the cell are also provided.

Methods for Sorting Particles of a Sample

Aspects of the present disclosure also include methods for sorting particles of a sample (e.g., cells in a biological sample). In practicing methods according to certain embodiments, a sample is irradiated with a light source and light from the sample is detected to generate an image mask of a cell in the sample and the cell is sorted based on the generated image mask. In some instances, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchioalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the flow stream with one or more lasers. As discussed above, the type and number of lasers will vary depending on the sample as well as desired light collected and may be a pulsed laser or continuous wave laser. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

The sample may be irradiated with one or more of the above-mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In practicing the subject methods, light from the irradiated sample is measured, such as by collecting light from the sample over a range of wavelengths (e.g., 200 nm-1000 nm). In embodiments, methods may include one or more of measuring light absorption by the sample (e.g., brightfield light data), measuring light scatter (e.g., forward or side scatter light data) and measuring light emission by the sample (e.g., fluorescence light data).

Light from the sample may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

Light may be collected over one or more of the wavelength ranges of 200 nm-1200 nm. In some instances, methods include measuring the light from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of certain fluorophores.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, light from the sample is measured 2 or more times, with the data in certain instances being averaged.

In some embodiments, methods include further adjusting the light from the sample before detecting the light. For example, the light from the sample source may be passed through one or more lenses, mirrors, pinholes, slits, gratings, light refractors, and any combination thereof. In some instances, the collected light is passed through one or more focusing lenses, such as to reduce the profile of the light. In other instances, the emitted light from the sample is passed through one or more collimators to reduce light beam divergence.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, methods include generating an image mask of a cell in the flow stream from the detected light. The image mask may be generated from detected light absorption, detected light scatter, detected light emission or any combination thereof. In some instances, the image mask is generated from light absorption detected from the sample, such as from a brightfield light detector. In these instances, the image mask is generated based on brightfield image data from the cell in the flow stream. In other instances, the image mask is generated from light scatter detected from the sample, such as from a side scatter detector, a forward scatter detector or a combination of a side scatter detector and forward scatter detector. In these instances, the image mask is generated based on scattered light image data. In yet other instances, the image mask is generated from emitted light from the sample, such as light from fluorophores added to the sample. In these instances, the image mask is generated based on fluorescent image data (i.e., imaging data from fluorescent compounds on or in the cell). In still other instances, the image mask is generated from a combination of detected light absorption, detected light scatter and detected light emission.

One or more image masks may be generated from the detected light. In some embodiments, a single image mask is generated from each form of detected light. For example, a first image mask of the cell is generated from detected light absorption; a second image mask of the cell is generated from detected light scatter and a third image mask of the cell is generated from detected light emission. In other embodiments, two or more image masks are generated from each form of detected light, such as 3 or more, such as 4 or more, such as 5 or more and including 10 or more image masks or a combination thereof.

To generate the image mask, methods according to certain embodiments include generating an image of the cell in the flow stream. In some embodiments, the image is a greyscale image of the cell in the flow stream. The term "greyscale" is used herein in its conventional sense to refer to images of the cell in the flow stream that are composed of varying shades of gray that are based on the intensity of light at each pixel. In embodiments, a pixel intensity threshold is determined from the greyscale image where the pixel intensity threshold value is used to convert each pixel into a binary value that is used to generate the image mask of the cell, as described in greater detail below. In some embodiments, the pixel intensity threshold is determined by minimizing the intra-class variance of the greyscale image and calculating a pixel intensity threshold that is based on the minimized intra-class variance. In some embodiments, the pixel intensity threshold is determined with an algorithm where the detected light data includes two classes of pixels following a bimodal histogram (having foreground pixels and background pixels), calculating an optimum threshold separating the two classes so that their combined intra-class variance is minimal. In other embodiments, methods include calculating an optimum threshold separating the two classes so that their inter-class variance is maximum.

In generating the image mask, each pixel in the greyscale image is compared against the determined intensity threshold value and converted to a binary pixel value. Each pixel in the greyscale image may be compared against the determined intensity threshold value in any order as desired. In some embodiments, pixels along each horizontal row in the greyscale image are compared against the determined intensity threshold value. In some instances, each pixel is compared against the determined intensity threshold value from the left side of the greyscale image to the right side of the greyscale image. In other instances, each pixel is compared against the determined intensity threshold value from the right side of the greyscale image to the left side of the greyscale image. In other embodiments, pixels along each vertical column in the greyscale image are compared against the determined intensity threshold value. In some instances, each pixel is compared against the determined intensity threshold value from the top of the greyscale image to the bottom of the greyscale image along each vertical column. In other instances, each pixel is compared against the determined intensity threshold value from the bottom of the greyscale image to the top of the greyscale image along each vertical column.

Depending on the size of the cell being imaged and the optics used to collect the light from the sample (described in greater detail below), all of part of the pixels in the greyscale image may be compared against the intensity threshold value. For example, in practicing the subject methods 50% or more of the pixels in the greyscale image may be compared against the intensity threshold value, such as 60% or more, such as 70% or more, such as 80% or more, such as 90% or more, such as 95% or more, such as 97% or more and including 99% or more of the pixels in the greyscale image. In certain embodiments, all (100%) of the pixels in the greyscale image of the cell are compared against the intensity threshold value.

As summarized above, each pixel in the greyscale image is converted to a binary pixel value. Depending on the type of light detected, each pixel is assigned a binary pixel value of 1 or a binary pixel value of 0. In one example, methods include detecting light absorption (e.g., brightfield image data) from the flow stream and assigning a binary pixel value of 1 to each pixel in the greyscale image when the pixel intensity is less than the intensity threshold value and assigning a binary pixel value of 0 when the pixel intensity of the greyscale image is greater than the intensity threshold value. In another example, methods include detecting light scatter from the cell in the flow stream and assigning a binary pixel value of 1 to each pixel in the greyscale image when the pixel intensity is greater than the intensity threshold value and assigning a binary pixel value of 0 when the pixel intensity is less than the intensity threshold value. In yet another example, methods include detecting fluorescence from the cell in the flow stream and assigning a binary pixel value of 1 to each pixel in the greyscale image when the pixel intensity is greater than the intensity threshold value and assigning a binary pixel value of 0 when the pixel intensity is less than the intensity threshold value.

Where a binary pixel value is assigned to each pixel in the greyscale image across a horizontal row, in some embodiments methods further include determining the first pixel across the horizontal row having a binary pixel value of 1 and determining the last pixel in the horizontal row having a binary pixel value of 1. In one example, methods include determining the first pixel from the left side of the horizontal row having an assigned binary pixel value of 1 and determining the last pixel from the left side of horizontal row having an assigned binary pixel value of 1. In another example, methods include determining the first pixel from the right side of the horizontal row having an assigned binary pixel value of 1 and determining the last pixel from the right side of horizontal row having an assigned binary pixel value of 1. In other embodiments, methods further include determining the first pixel across the horizontal row having a binary pixel value of 0 and determining the last pixel in the horizontal row having a binary pixel value of 0. In one example, methods include determining the first pixel from the left side of the horizontal row having an assigned binary pixel value of 0 and determining the last pixel from the left side of horizontal row having an assigned binary pixel value of 0. In another example, methods include determining the first pixel from the right side of the horizontal row having an assigned binary pixel value of 0 and determining the last pixel from the right side of horizontal row having an assigned binary pixel value of 0.

Where a binary pixel value is assigned to each pixel in the greyscale image along a vertical column, in some embodiments methods further include determining the first pixel along the vertical column having a binary pixel value of 1 and determining the last pixel along the vertical column having a binary pixel value of 1. In one example, methods include determining the first pixel from the top of the vertical column having an assigned binary pixel value of 1 and determining the last pixel from the top of the vertical column having an assigned binary pixel value of 1. In another example, methods include determining the first pixel from the bottom of the vertical column having an assigned binary pixel value of 1 and determining the last pixel from the bottom of the vertical column having an assigned binary pixel value of 1. In other embodiments, methods further include determining the first pixel along a vertical column having a binary pixel value of 0 and determining the last pixel in the vertical column having a binary pixel value of 0. In one example, methods include determining the first pixel from the top of the vertical column having an assigned binary pixel value of 0 and determining the last pixel from the top of the vertical column having an assigned binary pixel value of 0. In another example, methods include determining the first pixel from the bottom of the vertical column having an assigned binary pixel value of 0 and determining the last pixel from bottom of the vertical column having an assigned binary pixel value of 0.

In some embodiments, methods further include calculating an image moment from the image mask. The term "image moment" is used herein in its conventional sense to refer to a weighted average of pixel intensities in an image (e.g., generated image mask). As described below, the image moment determined from the image mask may be used to calculate total intensity of the pixels of the cell, the total area occupied by cell, the centroid (i.e., geometric center) of the cell as well as the orientation of the cell in the image mask. In some embodiments, the image moment is calculated from the image mask according to:

$$M_{m,n} = \Sigma(x-\bar{x})^m (y-\bar{y})^n \text{Im}(x,y) = M \cdot \text{Im}(x,y)$$

where m is the image moment computed along the x-axis of the image mask; and n is the image moment computed along the y-axis of the image mask.

Methods according to certain embodiments include determining one or more properties of the cell in the flow stream based on the generated image mask. For example, methods may include determining the size of the cell, the center of mass of the cell or the eccentricity of the cell based on the image mask. In these embodiments, methods include calculating one or more image moments of the image mask and determining the characteristic of the cell based on the image mask and calculated image moment.

In some instances, the center of mass may be calculated from the image moment of the image mask. For example, the center of mass may be calculated from the image moment of the image mask according to:

$$\text{Center of Mass} = \frac{M_{1,0}}{M_{0,0}}$$

In other instances, the orientation of the cell may be calculated from the image moment of the image mask. For example, the orientation of the cell may be calculated from the image moment of the image mask according to:

$$\text{Orientation of cell} = \frac{1}{2} \arctan \frac{2\left(M_{1,1} - \frac{M_{1,0} M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In still other instances, the eccentricity of the cell may be calculated from the image moment of the image mask. For example, the eccentricity of the cell may be calculated from the image moment of the image mask according to:

$$\text{Eccentricity} = \frac{M_{2,0} - \frac{M_{2,0}^2}{M_{0,0}^2} + M_{0,2} - \frac{M_{2,0}^2}{M_{0,0}^2} - \sqrt{4\left(M_{1,1} - \frac{M_{1,0} M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{2,0}^2}{M_{0,0}^2} + \sqrt{4\left(M_{1,1} - \frac{M_{1,0} M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In some embodiments, methods include generating a masked image of the cell in the flow stream. The masked image is generated by multiplying each pixel value from the image mask with the pixel value of an image of the cell. The image of the cell may be the greyscale image from which the image mask was generated or may be another image of the cell, such as from frequency-encoded image data obtained from the detected light (brightfield, scatter or emission) from the sample in the flow stream.

In some embodiments, methods further include calculating an image moment from the masked image. In some instances, the image moment from the masked image is calculated according to:

$$M_{m,n} = \Sigma(x-\bar{x})^m (y-\bar{y})^n \text{Im}(x,y) = M \cdot \text{Im}(x,y)$$

where m is the image moment computed along the x-axis of the masked image; and n is the image moment computed along the y-axis of the masked image.

Based on the masked image and the calculated image moment, one or more properties of the cell may be determined, such as cell size, cell orientation as well eccentricity of the cell. A comparison of the image mask and the masked image can also be used to determine the distribution of light signals within the boundaries of the image mask. In one example, the center of mass may be calculated from an image moment of the masked image. For instance, the center of mass may be calculated from the image moment of the masked image according to:

$$\text{Center of Mass} = \frac{M_{1,0}}{M_{0,0}}$$

In another example, the orientation of the cell may be calculated from an image moment of the masked image. For instance, the orientation of the cell may be calculated from the image moment of the masked image according to:

$$\text{Orientation of cell} = \frac{1}{2} \arctan \frac{2\left(M_{1,1} - \frac{M_{1,0} M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In yet example, the eccentricity of the cell may be calculated from an image moment of the masked image. For instance, the eccentricity of the cell may be calculated from the image moment of the masked image according to:

$$\text{Eccentricity} = \frac{M_{2,0} - \frac{M_{2,0}^2}{M_{0,0}^2} + M_{0,2} - \frac{M_{2,0}^2}{M_{0,0}^2} - \sqrt{4\left(M_{1,1} - \frac{M_{1,0} M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{2,0}^2}{M_{0,0}^2} + \sqrt{4\left(M_{1,1} - \frac{M_{1,0} M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In some embodiments, methods include comparing for each cell, two or more of the image, the image mask and the masked image. In some instances, the image and the image mask of the cell are compared. In other instances, the image and the masked image of the cell are compared. In still other instances, the image mask and the masked image of the cell are compared. In other embodiments, methods include generating and comparing two or more different image masks of the cell, two or more different images of the cell or two or more different masked images of the cell.

In some embodiments, a co-localization coefficient that is a measure of the degree of colocalization for one or more features of the cell is calculated. The feature of the cell may be, for example, an intracellular organelle (e.g., nucleus, mitochondria) or an intracellular macromolecule (e.g., protein, nucleic acid). In some instances, the co-localization coefficient is calculated from two or more different image masks of the cell. In other instances, the co-localization coefficient is calculated from two or more different images of the cell. In yet other instances, the co-localization coefficient is calculated from two or more different masked images of the cell. In some embodiments, the co-localization coefficient is calculated from an image and an image mask of the cell. In other embodiments, the co-localization coefficient is calculated from an image and a masked image of the cell. In yet other embodiments, the co-localization coefficient is calculated from an image mask and a masked image of the cell.

In certain embodiments, the co-localization coefficient for the feature of the cell is calculated according to:

$$r = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}}$$

where x is an image pixel for a first image, a first image mask or a first masked image; y is an image pixel for a second image, a second image mask or a second masked image; $\bar{x}$ is average pixel value for the first image, the first image mask or the first masked image; and $\bar{y}$ is average pixel value for the second image, the second image mask or the second masked image.

In other embodiments, the co-localization coefficient for the feature of the cell is calculated according to:

$$r = \frac{\sum_{i=1}^{n}(x_i y_i) - n\bar{x}\bar{y}}{\sqrt{\sum_{i=1}^{n}(x_i^2) - n\bar{x}^2} \sqrt{\sum_{i=1}^{n}(y_i^2) - n\bar{y}^2}}$$

In still other embodiments, the co-localization coefficient for the feature of the cell is calculated according to:

$$\log r = \log(\Sigma_{i=1}^{n}(x_i y_i) - n\overline{xy}) - 0.5 * \log(\Sigma_{i=1}^{n}(x_i^2) - n\bar{x}^2) - 0.5 * \log(\Sigma_{i=1}^{n}(y_i^2) - n\bar{y}^2)$$

FIG. 1 depicts a flow chart for imaging and characterizing a cell in a flow stream according to certain embodiments. At step 101, light (light absorption, scattered light or emission) from a cell in a flow stream are detected. At step 102, an image (e.g., a greyscale image) of the cell is generated. At step 103, a pixel intensity threshold is determined based on the pixels from the image. At step 104, each pixel in the image is converted to a binary pixel value by comparing the intensity of each pixel against the determined pixel intensity threshold. An image mask is then generated using the binary pixel values at step 105. The image mask may be used to generate a masked image at step 106. Two or more image masks may be used calculate co-localization of one or more features of the cell (e.g., cellular organelles) at step 107 or co-localization may be calculated using the image mask and the masked image at step 108.

As summarized above, methods of the present disclosure also include sorting cells of the sample. The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, methods may include sorting 2 or more components of the sample, such as 3 or more components, such as 4 or more components, such as 5 or more components, such as 10 or more components, such as 15 or more components and including sorting 25 or more components of the sample. In embodiments, methods including sorting cells based on the generated image mask of the cell.

In sorting the cell, methods include data acquisition, analysis and recording, such as with a computer, where multiple data channels record data from each detector used in generating the image, image mask or masked image of the cell (e.g., scatter detectors, brightfield photodetectors or fluorescence detectors). In these embodiments, analysis includes classifying and counting particles such that each particle is present as a set of digitized parameter values. The subject systems (described below) may be set to trigger on a selected parameter in order to distinguish the particles of interest from background and noise.

A particular subpopulation of interest may then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two-dimensional dot plot. A subpopulation of particles is then selected (i.e., those cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

In some embodiments, methods for sorting components of sample include sorting particles (e.g., cells in a biological sample) with particle sorting module having deflector plates, such as described in U.S. Patent Publication No. 2017/0299493, filed on Mar. 28, 2017, the disclosure of which is incorporated herein by reference. In certain embodiments, cells of the sample are sorted using a sort decision module having a plurality of sort decision units, such as those described in U.S. Provisional Patent Application No. 62/803,264, filed on Feb. 8, 2019, the disclosure of which is incorporated herein by reference.

Systems for Sorting Particles of a Sample

As summarized above, aspects of the present disclosure include a system for sorting particles of a sample. Systems according to certain embodiments, include a light source configured to irradiate a sample having cells in a flow stream, a light detection system having one or more photodetectors, a processor having memory operably coupled to the processor such that the memory includes instructions stored thereon, which when executed by the processor, cause the processor to generate an image mask of a cell in the flow stream and a cell sorting component that is configured to sort cells in the sample based on the generated image mask. In embodiments, the subject systems are configured to sort components of a sample, such as cells in a biological sample. As described above, sorting is referred to herein in its conventional sense as separating components (e.g., cells, non-cellular particles such as biological macromolecules) of the sample and in some instances delivering the separated components to one or more sample collection containers. For example, the subject systems may be configured for sorting samples having 2 or more components, such as 3 or more components, such as 4 or more components, such as 5 or more components, such as 10 or more components, such as 15 or more components and including sorting a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

Systems of interest include a light source configured to irradiate a sample having cells in a flow stream. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, systems include a light detection system having one or more photodetectors for detecting and measuring light from the sample. Photodetectors of interest may be configured to measure light absorption (e.g., for brightfield light data), light scatter (e.g., forward or side scatter light data), light emission (e.g., fluorescence light data) from the sample or a combination thereof. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm, where the surface area of each photodetector (e.g., photodiode) in the array ranges from 25 to $\mu m^2$ to 10000 $\mu m^2$, such as from 50 to $\mu m^2$ to 9000 $\mu m^2$, such as from 75 to $\mu m^2$ to 8000 $\mu m^2$, such as from 100 to $\mu m^2$ to 7000 $\mu m^2$, such as from 150 to $\mu m^2$ to 6000 $\mu m^2$ and including from 200 to $\mu m^2$ to 5000 $\mu m^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 $mm^2$ to 10000 $mm^2$, such as from 0.5 $mm^2$ to 5000 $mm^2$, such as from 1 $mm^2$ to 1000 $mm^2$, such as from 5 $mm^2$ to 500 $mm^2$, and including from 10 $mm^2$ to 100 $mm^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In embodiments, systems are configured to analyze light from the irradiated sample and to generate an image mask of a cell in the flow stream in real time so that cells from the sample can be sorted based on the generated image mask. Systems of interest may include computer controlled systems where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating a flow cell having a sample in a flow stream with a light source and detecting light from the flow cell with a light detection system having a plurality of photodetectors, generating a image mask of the cell in the flow stream; and sorting cells in the sample based on the generated image mask.

In some embodiments, systems include a computer having a computer readable storage medium with a computer program stored thereon, where the computer program when loaded on the computer further includes instructions for generating an image of a cell in the flow stream from the detected light. The image may be generated from detected light absorption, detected light scatter, detected light emission or any combination thereof. In certain embodiments, the image of the cell in the flow stream is a greyscale image. In some instances, the greyscale image is generated by the subject system from light absorption detected from the sample, such as from a brightfield light detector. In these instances, the greyscale image is generated based on brightfield image data from the cell in the flow stream. In other instances, the greyscale image is generated by the subject system from light scatter detected from the sample, such as from a side scatter detector, a forward scatter detector or a combination of a side scatter detector and forward scatter detector. In these instances, the greyscale image is generated based on scattered light image data. In yet other instances, the greyscale image is generated by the subject system from emitted light from the sample, such as light from fluorophores added to the sample. In these instances, the greyscale image is generated based on fluorescent image data (i.e., imaging data from fluorescent compounds on or in the cell). In still other instances, the greyscale image is generated by the subject system from a combination of detected light absorption, detected light scatter and detected light emission.

In embodiments, systems include a computer having a computer readable storage medium with a computer program stored thereon, where the computer program when loaded on the computer further includes instructions for determining a pixel intensity threshold value from the greyscale image. In some embodiments, the computer program includes instructions which when executed by the processor cause the processor to determine the pixel intensity threshold value from the greyscale image by minimizing the intra-class variance of the greyscale image and calculating a pixel intensity threshold that is based on the minimized intra-class variance (or where inter-class variance is maximal).

Systems include memory with instructions to compare each pixel in the greyscale image against the determined intensity threshold value and to convert each pixel to a binary pixel value. In some embodiments, the memory includes instructions to compare pixels along each horizontal row in the greyscale image against the determined intensity threshold value. In some instances, the memory includes instructions to compare pixels against the determined intensity threshold value from the left side of the greyscale image to the right side of the greyscale image. In other instances, the memory includes instructions to compare pixels against the determined intensity threshold value from the right side of the greyscale image to the left side of the greyscale image. In other embodiments, the memory includes instructions to compare pixels along each vertical column in the greyscale image against the determined intensity threshold value. In some instances, the memory includes instructions to compare pixels against the determined intensity threshold value from the top of the greyscale image to the bottom of the greyscale image along each vertical column. In other instances, the memory includes instructions to compare pixels against the determined intensity threshold value from the bottom of the greyscale image to the top of the greyscale image along each vertical column.

Depending on the type of light detected, each pixel is assigned a binary pixel value of 1 or a binary pixel value of 0. In one example, systems include a computer program that includes instructions for detecting light absorption (e.g., brightfield image data) from the flow stream and assigning a binary pixel value of 1 to each pixel in the greyscale image when the pixel intensity is less than the intensity threshold value and assigning a binary pixel value of 0 when the pixel intensity of the greyscale image is greater than the intensity threshold value. In another example, systems include a computer program that includes instructions for detecting light scatter from the cell in the flow stream and assigning a binary pixel value of 1 to each pixel in the greyscale image when the pixel intensity is greater than the intensity threshold value and assigning a binary pixel value of 0 when the pixel intensity is less than the intensity threshold value. In yet another example, systems include a computer program that includes instructions for detecting fluorescence from the cell in the flow stream and assigning a binary pixel value of 1 to each pixel in the greyscale image when the pixel intensity is greater than the intensity threshold value and assigning a binary pixel value of 0 when the pixel intensity is less than the intensity threshold value.

Where a binary pixel value is assigned by the subject system to each pixel in the greyscale image across a horizontal row, in some embodiments systems include a computer program that includes instructions for further determining the first pixel across the horizontal row having a binary pixel value of 1 and determining the last pixel in the horizontal row having a binary pixel value of 1. In one example, systems include a computer program that includes instructions for determining the first pixel from the left side of the horizontal row having an assigned binary pixel value of 1 and determining the last pixel from the left side of horizontal row having an assigned binary pixel value of 1. In another example, systems include a computer program that includes instructions for determining the first pixel from the right side of the horizontal row having an assigned binary pixel value of 1 and determining the last pixel from the right side of horizontal row having an assigned binary pixel value of 1. In other embodiments, systems include a computer program that includes instructions for further determining the first pixel across the horizontal row having a binary pixel value of 0 and determining the last pixel in the horizontal row having a binary pixel value of 0. In one example, systems include a computer program that includes instructions for determining the first pixel from the left side of the horizontal row having an assigned binary pixel value of 0 and determining the last pixel from the left side of horizontal row having an assigned binary pixel value of 0. In another example, systems include a computer program that includes instructions for determining the first pixel from the right side of the horizontal row having an assigned binary pixel value of 0 and determining the last pixel from the right side of horizontal row having an assigned binary pixel value of 0.

Where a binary pixel value is assigned to each pixel in the greyscale image along a vertical column, in some embodiments systems include a computer program that includes instructions for further determining the first pixel along the vertical column having a binary pixel value of 1 and determining the last pixel along the vertical column having a binary pixel value of 1. In one example, systems include a computer program that includes instructions for determining the first pixel from the top of the vertical column having an assigned binary pixel value of 1 and determining the last pixel from the top of the vertical column having an assigned binary pixel value of 1. In another example, systems include a computer program that includes instructions for determining the first pixel from the bottom of the vertical column having an assigned binary pixel value of 1 and determining the last pixel from the bottom of the vertical column having an assigned binary pixel value of 1. In other embodiments, systems include a computer program that includes instructions for further determining the first pixel along a vertical column having a binary pixel value of 0 and determining the last pixel in the vertical column having a binary pixel value of 0. In one example, systems include a computer program that includes instructions for determining the first pixel from the top of the vertical column having an assigned binary pixel value of 0 and determining the last pixel from the top of the vertical column having an assigned binary pixel value of 0. In another example, systems include a computer program that includes instructions for determining the first pixel from the bottom of the vertical column having an assigned binary pixel value of 0 and determining the last pixel from bottom of the vertical column having an assigned binary pixel value of 0.

In some embodiments, systems include a computer having a computer readable storage medium with a computer program stored thereon, where the computer program when loaded on the computer further includes instructions for calculating an image moment from the image mask. In some instances, systems include a computer program that includes instructions for calculating an image moment from the image mask according to:

$$M_{m,n} = \Sigma(x-\bar{x})^m (y-\bar{y})^n \, \text{Im}(x,y) = M \cdot \text{Im}(x,y)$$

where m is the image moment computed along the x-axis of the image mask; and n is the image moment computed along the y-axis of the image mask.

In certain embodiments, systems include a computer program that includes instructions for determining one or more properties of the cell in the flow stream based on the generated image mask. For example, systems may include a computer program that includes instructions for determining the size of the cell, the center of mass of the cell or the eccentricity of the cell based on the image mask. In these embodiments, systems include a computer program that includes instructions for calculating one or more image moments of the image mask and determining the characteristic of the cell based on the image mask and calculated image moment.

In some instances, systems include a computer program that includes instructions for calculating the center of mass from the image moment of the image mask. For example, the center of mass may be calculated by the subject system from the image moment of the image mask according to:

$$\text{Center of Mass} = \frac{M_{1,0}}{M_{0,0}}$$

In other instances, systems include a computer program that includes instructions for calculating the orientation of the cell from the image moment of the image mask. For example, the orientation of the cell may be calculated by the subject system from the image moment of the image mask according to:

$$\text{Orientation of cell} = \frac{1}{2} \arctan \frac{2\left(M_{1,1} - \frac{M_{1,0} M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In still other instances, systems include a computer program that includes instructions for calculating the eccentricity of the cell from the image moment of the image mask. For example, the eccentricity of the cell may be calculated by the subject system from the image moment of the image mask according to:

$$\text{Eccentricity} = \frac{M_{2,0} - \frac{M_{2,0}^2}{M_{0,0}^2} + M_{0,2} - \frac{M_{0,2}^2}{M_{0,0}^2} - \sqrt{4\left(M_{1,1} - \frac{M_{1,0} M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{0,2}^2}{M_{0,0}^2} + \sqrt{4\left(M_{1,1} - \frac{M_{1,0} M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In some embodiments, systems include a computer having a computer readable storage medium with a computer program stored thereon, where the computer program when loaded on the computer further includes instructions for generating a masked image of the cell in the flow stream. In these embodiments, systems include a computer program that includes instructions for multiplying each pixel value from the image mask with the pixel value of an image of the cell to generate a masked image. The image of the cell used by the system to generate the masked image may be the greyscale image from which the image mask was generated or may be another image of the cell, such as from frequency-encoded image data obtained from the detected light (brightfield, scatter or emission) from the sample in the flow stream.

In some embodiments, systems include a computer program that includes instructions for calculating an image moment from the masked image. In some instances, systems include a computer program that includes instructions for calculating the image moment from the masked image according to:

$$M_{m,n} = \Sigma(x-\bar{x})^m (y-\bar{y})^n \, \text{Im}(x,y) = M \cdot \text{Im}(x,y)$$

where m is the image moment computed along the x-axis of the masked) where m is the image moment computed along the x-axis of the masked image; and n is the image moment computed along the y-axis of the masked image.

Based on the masked image and the calculated image moment, the subject systems may be configured to determine one or more properties of the cell, such as cell size, cell orientation as well eccentricity of the cell. The subject systems may also be configured to compare the image mask and the masked image to determine the distribution of light signals within the boundaries of the image mask. In one example, systems include a computer program that includes instructions for calculating the center of mass from the image moment of the masked image according to:

$$\text{Center of Mass} = \frac{M_{1,0}}{M_{0,0}}$$

In another example, systems include a computer program that includes instructions for calculating the orientation of the cell from the image moment of the masked image according to:

$$\text{Orientation of cell} = \frac{1}{2} \arctan \frac{2\left(M_{1,1} - \frac{M_{1,0} M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In yet example, systems include a computer program that includes instructions for calculating the eccentricity of the cell from the image moment of the masked image according to:

$$\text{Eccentricity} = \frac{M_{2,0} - \frac{M_{2,0}^2}{M_{0,0}^2} + M_{0,2} - \frac{M_{0,2}^2}{M_{0,0}^2} - \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{0,2}^2}{M_{0,0}^2} + \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In some embodiments, systems include a computer having a computer readable storage medium with a computer program stored thereon, where the computer program when loaded on the computer further includes instructions for comparing for each cell, two or more of the image, the image mask and the masked image. In some instances, systems include a computer program that includes instructions for comparing the image and the image mask of the cell. In other instances, systems include a computer program that includes instructions for comparing the image and the masked image of the cell. In still other instances, systems include a computer program that includes instructions for comparing the image mask and the masked image of the cell. In other embodiments, systems include a computer program that includes instructions for generating and comparing two or more different image masks of the cell, two or more different images of the cell or two or more different masked images of the cell.

In certain embodiments, systems are configured to calculate a co-localization coefficient for one or more features of the cells in the generated images, image masks or masked images. In some instances, systems include a computer program that includes instructions for calculating the co-localization coefficient from two or more different image masks of the cell. In other instances, systems include a computer program that includes instructions for calculating the co-localization coefficient from two or more different images of the cell. In yet other instances, systems include a computer program that includes instructions for calculating the co-localization coefficient from two or more different masked images of the cell. In some embodiments, systems include a computer program that includes instructions for calculating the co-localization coefficient from an image and an image mask of the cell. In other embodiments, systems include a computer program that includes instructions for calculating the co-localization coefficient from an image and a masked image of the cell. In other embodiments, systems include a computer program that includes instructions for calculating the co-localization coefficient an image mask and a masked image of the cell.

In some embodiments, systems include a computer having a computer readable storage medium with a computer program stored thereon, where the computer program when loaded on the computer further includes instructions for calculating the co-localization coefficient for the feature of the cell according to:

$$r = \frac{\Sigma_{i=1}^n (x_i - \bar{x})(y_i - \bar{y})}{\sqrt{\Sigma_{i=1}^n (x_i - \bar{x})^2} \sqrt{\Sigma_{i=1}^n (y_i - \bar{y})^2}}$$

where x is an image pixel for a first image, a first image mask or a first masked image; y is an image pixel for a second image, a second image mask or a second masked image; $\bar{x}$ is average pixel value for the first image, the first image mask or the first masked image; and $\bar{y}$ is average pixel value for the second image, the second image mask or the second masked image.

In other embodiments, systems include a computer program that includes instructions for calculating the co-localization coefficient for the feature of the cell according to:

$$r = \frac{\Sigma_{i=1}^n (x_i y_i) - n\bar{x}\bar{y}}{\sqrt{\Sigma_{i=1}^n (x_i^2) - n\bar{x}^2} \sqrt{\Sigma_{i=1}^n (y_i^2) - n\bar{y}^2}}$$

In still other embodiments, systems include a computer program that includes instructions for calculating the co-localization coefficient for the feature of the cell according to:

$$\log r = \log(\Sigma_{i=1}^n (x_i y_i) - n\bar{x}\bar{y}) - 0.5 * \log(\Sigma_{i=1}^n (x_i^2) - n\bar{x}^2) - 0.5 * \log(\Sigma_{i=1}^n (y_i^2) - n\bar{y}^2)$$

Sorting systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

In certain embodiments, the subject systems include one or more optical adjustment components for adjusting the light such as light irradiated onto the sample (e.g., from a laser) or light collected from the sample (e.g., scattered, fluorescence). For example, the optical adjustment may be to increase the dimensions of the light, the focus of the light or to collimate the light. In some instances, optical adjustment is a magnification protocol so as to increase the dimensions of the light (e.g., beam spot), such as increasing the dimensions by 5% or more, such as by 10% or more, such as by 25% or more, such as by 50% or more and including increasing the dimensions by 75% or more. In other embodiments, optical adjustment includes focusing the light so as to reduce the light dimensions, such as by 5% or greater, such as by 10% or greater, such as by 25% or greater, such as by 50% or greater and including reducing the dimensions of the beam spot by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam (e.g., reducing the beam profile of a laser)

In some embodiments, the optical adjustment component is a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75 and including a magnification ratio of from 0.55 to 0.7, for example a magnification ratio of 0.6. For example, the focusing lens is, in certain instances, a double achromatic de-magnifying lens having a magnification ratio of about 0.6. The focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In other embodiments, the optical adjustment component is a collimator. The collimator may be any convenient collimating protocol, such as one or more mirrors or curved lenses or a combination thereof. For example, the collimator is in certain instances a single collimating lens. In other instances, the collimator is a collimating mirror. In yet other instances, the collimator includes two lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In some embodiments, the subject systems include a flow cell nozzle having a nozzle orifice configured to flow a flow stream through the flow cell nozzle. The subject flow cell nozzle has an orifice which propagates a fluidic sample to a sample interrogation region, where in some embodiments, the flow cell nozzle includes a proximal cylindrical portion defining a longitudinal axis and a distal frustoconical portion which terminates in a flat surface having the nozzle orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the nozzle chamber does not include a cylindrical portion and the entire flow cell nozzle chamber is frustoconically shaped. In these embodiments, the length of the frustoconical nozzle chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical nozzle chamber may range from 1 mm to 10 mm, such as from 2 mm to 9 mm, such as from 3 mm to 8 mm and including from 4 mm to 7 mm.

In embodiments, the sample flow stream emanates from an orifice at the distal end of the flow cell nozzle. Depending on the desired characteristics of the flow stream, the flow cell nozzle orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell nozzle of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell nozzle includes a sample injection port configured to provide a sample to the flow cell nozzle. In embodiments, the sample injection system is configured to provide suitable flow of sample to the flow cell nozzle chamber. Depending on the desired characteristics of the flow stream, the rate of sample conveyed to the flow cell nozzle chamber by the sample injection port may be 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more, such as 100 µL/sec or more, such as 150 µL/sec or more, such as 200 µL/sec or more, such as 250 µL/sec or more, such as 300 µL/sec or more, such as 350 µL/sec or more, such as 400 µL/sec or more, such as 450 µL/sec or more and including 500 µL/sec or more. For example, the sample flow rate may range from 1 µL/sec to about 500 µL/sec, such as from 2 µL/sec to about 450 µL/sec, such as from 3 µL/sec to about 400 µL/sec, such as from 4 µL/sec to about 350 µL/sec, such as from 5 μL/sec to about 300 μL/sec, such as from 6 μL/sec to about 250 μL/sec, such as from 7 μL/sec to about 200 μL/sec, such as from 8 μL/sec to about 150 μL/sec, such as from 9 μL/sec to about 125 μL/sec and including from 10 μL/sec to about 100 μL/sec.

The sample injection port may be an orifice positioned in a wall of the nozzle chamber or may be a conduit positioned at the proximal end of the nozzle chamber. Where the sample injection port is an orifice positioned in a wall of the nozzle chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell nozzle chamber. For example, the sample injection port may be a conduit positioned to have the orifice of the sample injection port in line with the flow cell nozzle orifice. Where the sample injection port is a conduit positioned in line with the flow cell nozzle orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1 to 10°, such as from 2° to 9°, such as from 3° to 8°, such as from 4° to 7° and including a bevel angle of 5°.

In some embodiments, the flow cell nozzle also includes a sheath fluid injection port configured to provide a sheath fluid to the flow cell nozzle. In embodiments, the sheath fluid injection system is configured to provide a flow of sheath fluid to the flow cell nozzle chamber, for example in conjunction with the sample to produce a laminated flow stream of sheath fluid surrounding the sample flow stream. Depending on the desired characteristics of the flow stream, the rate of sheath fluid conveyed to the flow cell nozzle chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more. For example, the sheath fluid flow rate may range from 1 μL/sec to about 500 μL/sec, such as from 2 μL/sec to about 450 μL/sec, such as from 3 μL/sec to about 400 μL/sec, such as from 4 μL/sec to about 350 μL/sec, such as from 5 μL/sec to about 300 μL/sec, such as from 6 μL/sec to about 250 μL/sec, such as from 7 μL/sec to about 200 μL/sec, such as from 8 μL/sec to about 150 μL/sec, such as from 9 μL/sec to about 125 μL/sec and including from 10 μL/sec to about 100 μL/sec.

In some embodiments, the sheath fluid injection port is an orifice positioned in a wall of the nozzle chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

The subject systems, in certain instances, include a sample interrogation region in fluid communication with the flow cell nozzle orifice. In these instances, a sample flow stream emanates from an orifice at the distal end of the flow cell nozzle and particles in the flow stream may be irradiated with a light source at the sample interrogation region. The size of the interrogation region may vary depending on the properties of the flow nozzle, such as the size of the nozzle orifice and sample injection port size. In embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more.

The interrogation region may be configured to facilitate irradiation of a planar cross-section of an emanating flow stream or may be configured to facilitate irradiation of a diffuse field (e.g., with a diffuse laser or lamp) of a predetermined length. In some embodiments, the interrogation region includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm. As such, the interrogation region may be formed from any transparent material which passes the desired range of wavelength, including but not limited to optical glass, borosilicate glass, Pyrex glass, ultraviolet quartz, infrared quartz, sapphire as well as plastic, such as polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials, including polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly (hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly (tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc. In some embodiments, the subject systems include a cuvette positioned in the sample interrogation region. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In some embodiments, the subject systems include a particle sorting component for sorting cells of the sample. In certain instances, the particle sorting component is a particle sorting module such as those described in U.S. Patent Publication No. 2017/0299493, filed on Mar. 28, 2017 and U.S. Provisional Patent Application No. 62/752,793 filed on Oct. 30, 2018, the disclosures of which is incorporated herein by reference. In certain embodiments, the particle sorting component include one or more droplet deflectors such as those described in U.S. Patent Publication No. 2018/0095022, filed on Jun. 14, 2017, the disclosure of which is incorporated herein by reference.

In some embodiments, the subject systems are flow cytometric systems employing the above described weighted least squares algorithm for analyzing and sorting particles in a sample (e.g., cells in a biological sample). Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol,* 2010 December; 222(4):335-344; and Herbig, et al. (2007) *Crit Rev Ther Drug Carrier Syst.* 24(3): 203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACS-Lyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain instances, the subject systems are flow cytometry systems configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

Integrated Circuit Devices

Aspects of the present disclosure also include integrated circuit devices programmed to generate an image mask of a cell in a flow stream and sort the cell based on the generated image mask. In some embodiments, integrated circuit devices of interest include a field programmable gate array (FPGA). In other embodiments, integrated circuit devices include an application specific integrated circuit (ASIC). In yet other embodiments, integrated circuit devices include a complex programmable logic device (CPLD).

In some embodiments, the integrated circuit device is programmed to generate a greyscale image of a cell in the flow stream from the detected light. In these embodiments, the integrated circuit device is programmed for determining a pixel intensity threshold value from the greyscale image. In some embodiments, the integrated circuit device is programmed for determining the pixel intensity threshold value from the greyscale image by minimizing the intra-class variance of the greyscale image and calculating a pixel intensity threshold that is based on the minimized intra-class variance (or where inter-class variance is maximal).

The integrated circuit device is programmed to compare each pixel in the greyscale image against the determined intensity threshold value and to convert each pixel to a binary pixel value. In some embodiments, the integrated circuit device is programmed to compare pixels along each horizontal row in the greyscale image against the determined intensity threshold value. In some instances, the integrated circuit device is programmed to compare pixels against the determined intensity threshold value from the left side of the greyscale image to the right side of the greyscale image. In other instances, the integrated circuit device is programmed to compare pixels against the determined intensity threshold value from the right side of the greyscale image to the left side of the greyscale image. In other embodiments, the integrated circuit device is programmed to compare pixels along each vertical column in the greyscale image against the determined intensity threshold value. In some instances, the integrated circuit device is programmed to compare pixels against the determined intensity threshold value from the top of the greyscale image to the bottom of the greyscale image along each vertical column. In other instances, the integrated circuit device is programmed to compare pixels against the determined intensity threshold value from the bottom of the greyscale image to the top of the greyscale image along each vertical column.

Depending on the type of light detected, each pixel is assigned by the integrated circuit device a binary pixel value of 1 or a binary pixel value of 0. In one example, the integrated circuit device is programmed to assign a binary pixel value of 1 to each pixel in the greyscale image when the pixel intensity is less than the intensity threshold value and assigning a binary pixel value of 0 when the pixel intensity of the greyscale image is greater than the intensity threshold value. In another example, the integrated circuit device is programmed to assign a binary pixel value of 1 to each pixel in the greyscale image when the pixel intensity is greater than the intensity threshold value and assigning a binary pixel value of 0 when the pixel intensity is less than the intensity threshold value.

Where a binary pixel value is assigned to each pixel in the greyscale image across a horizontal row, in some embodiments the integrated circuit device is programmed to further determine the first pixel across the horizontal row having a binary pixel value of 1 and determine the last pixel in the horizontal row having a binary pixel value of 1. In one example, the integrated circuit device is programmed to determine the first pixel from the left side of the horizontal row having an assigned binary pixel value of 1 and determiner the last pixel from the left side of horizontal row having an assigned binary pixel value of 1. In another example, the integrated circuit device is programmed to determine the first pixel from the right side of the horizontal row having an assigned binary pixel value of 1 and determine the last pixel from the right side of horizontal row having an assigned binary pixel value of 1. In other embodiments, the integrated circuit device is programmed to determine the first pixel across the horizontal row having a binary pixel value of 0 and determine the last pixel in the horizontal row having a binary pixel value of 0. In one example, the integrated circuit device is programmed to determine the first pixel from the left side of the horizontal row having an assigned binary pixel value of 0 and determine the last pixel from the left side of horizontal row having an assigned binary pixel value of 0. In another example, the integrated circuit device is programmed to determine the first pixel from the right side of the horizontal row having an assigned binary pixel value of 0 and determine the last pixel from the right side of horizontal row having an assigned binary pixel value of 0.

Where a binary pixel value is assigned to each pixel in the greyscale image along a vertical column, in some embodiments the integrated circuit device is programmed to further determine the first pixel along the vertical column having a binary pixel value of 1 and determine the last pixel along the vertical column having a binary pixel value of 1. In one example, the integrated circuit device is programmed to determine the first pixel from the top of the vertical column having an assigned binary pixel value of 1 and determine the last pixel from the top of the vertical column having an assigned binary pixel value of 1. In another example, the integrated circuit device is programmed to determine the first pixel from the bottom of the vertical column having an assigned binary pixel value of 1 and determine the last pixel from the bottom of the vertical column having an assigned binary pixel value of 1. In other embodiments, the integrated circuit device is programmed to further determine the first pixel along a vertical column having a binary pixel value of 0 and determine the last pixel in the vertical column having a binary pixel value of 0. In one example, the integrated circuit device is programmed to determine the first pixel from the top of the vertical column having an assigned binary pixel value of 0 and determine the last pixel from the top of the vertical column having an assigned binary pixel value of 0. In another example, the integrated circuit device is programmed to determine the first pixel from the bottom of the vertical column having an assigned binary pixel value of 0 and determine the last pixel from bottom of the vertical column having an assigned binary pixel value of 0.

In some embodiments, the integrated circuit device is programmed to calculate an image moment from the image mask. In some instances, the integrated circuit device is programmed to calculate an image moment from the image mask according to:

$$M_{m,n} = \Sigma(x-\bar{x})^m(y-\bar{y})^n \operatorname{Im}(x,y) = M \cdot \operatorname{Im}(x,y)$$

where m is the image moment computed along the x-axis of the image mask; and n is the image moment computed along the y-axis of the image mask.

In certain embodiments, the integrated circuit device is programmed to determine one or more properties of the cell in the flow stream based on the generated image mask. For example, the integrated circuit device may be programmed to determine the size of the cell, the center of mass of the cell or the eccentricity of the cell based on the image mask. In these embodiments, the integrated circuit device is programmed for determining one or more image moments of the image mask and determining the characteristic of the cell based on the image mask and calculated image moment.

In some instances the integrated circuit device is programmed to calculate the center of mass from the image moment of the image mask. For example, the center of mass may be calculated according to:

$$\text{Center of Mass} = \frac{M_{1,0}}{M_{0,0}}$$

In other instances, the integrated circuit device is programmed to calculate the orientation of the cell from the image moment of the image mask. For example, the orientation of the cell may be calculated according to:

$$\text{Orientation of cell} = \frac{1}{2}\arctan\frac{2\left(M_{1,1} - \frac{M_{1,0}M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In still other instances, the integrated circuit device is programmed to calculate the eccentricity of the cell from the image moment of the image mask. For example, the eccentricity of the cell may be calculated according to:

$$\text{Eccentricity} = \frac{M_{2,0} - \frac{M_{2,0}^2}{M_{0,0}^2} + M_{0,2} - \frac{M_{0,2}^2}{M_{0,0}^2} - \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{0,2}^2}{M_{0,0}^2} + \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In some embodiments, the integrated circuit device is programmed to generate a masked image of the cell in the flow stream. In these embodiments, the integrated circuit device is programmed to multiply each pixel value from the image mask with the pixel value of an image of the cell to generate a masked image.

In some embodiments, the integrated circuit device is programmed to calculate an image moment from the masked image. In some instances, the integrated circuit device is programmed to calculate the image moment from the masked image according to:

$$M_{m,n} = \Sigma(x-\bar{x})^m(y-\bar{y})^n \, \text{Im}(x,y) = M \cdot \text{Im}(x,y)$$

where m is the image moment computed along the x-axis of the masked image; and n is the image moment computed along the y-axis of the masked image.

The subject integrated circuit devices may also be programmed to compare the image mask and the masked image to determine the distribution of light signals within the boundaries of the image mask. In one example, the integrated circuit device is programmed to calculate the center of mass from the image moment of the masked image according to:

$$\text{Center of Mass} = \frac{M_{1,0}}{M_{0,0}}$$

In another example, the integrated circuit device is programmed to calculate the orientation of the cell from the image moment of the masked image according to:

$$\text{Orientation of cell} = \frac{1}{2}\arctan\frac{2\left(M_{1,1} - \frac{M_{1,0}M_{0,1}}{M_{0,0}}\right)}{M_{2,0} - \frac{M_{2,0}^2}{M_{0,0}} - M_{0,2} + \frac{M_{0,2}^2}{M_{0,0}}}$$

In yet example, the integrated circuit device is programmed to calculate the eccentricity of the cell from the image moment of the masked image according to:

$$\text{Eccentricity} = \frac{M_{2,0} - \frac{M_{2,0}^2}{M_{0,0}^2} + M_{0,2} - \frac{M_{0,2}^2}{M_{0,0}^2} - \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}{M_{2,0} - \frac{M_{2,0}^2}{M_{0,0}^2} + M_{0,2} - \frac{M_{0,2}^2}{M_{0,0}^2} + \sqrt{4\left(M_{1,1} - \frac{M_{1,0}M_{0,1}}{M_{0,0}^2}\right)^2 + \left(M_{2,0} - \frac{M_{2,0}^2}{M_{0,0}} - M_{0,2} + \frac{M_{0,2}^2}{M_{0,0}}\right)^2}}$$

In some embodiments, the integrated circuit device is programmed to compare for each cell, two or more of the image, the image mask and the masked image. In some instances, the integrated circuit device is programmed to compare the image and the image mask of the cell. In other instances, the integrated circuit device is programmed to compare the image and the masked image of the cell. In still other instances, the integrated circuit device is programmed to compare the image mask and the masked image of the cell. In other embodiments, the integrated circuit device is programmed to generate and compare two or more different image masks of the cell, two or more different images of the cell or two or more different masked images of the cell.

In certain embodiments, the integrated circuit device is programmed to calculate a co-localization coefficient for one or more features of the cells in the generated images, image masks or masked images. In some instances, the integrated circuit device is programmed to calculate the co-localization coefficient from two or more different image masks of the cell. In other instances, the integrated circuit device is programmed to calculate the co-localization coefficient from two or more different images of the cell. In yet other instances, the integrated circuit device is programmed to calculate the co-localization coefficient from two or more different masked images of the cell. In some embodiments, the integrated circuit device is programmed to calculate the co-localization coefficient from an image and an image mask of the cell. In other embodiments, the integrated circuit device is programmed to calculate the co-localization coefficient from an image and a masked image of the cell. In yet other embodiments, the integrated circuit device is programmed to calculate the co-localization coefficient an image mask and a masked image of the cell.

In some embodiments, the integrated circuit device is programmed to calculate the co-localization coefficient for the feature of the cell according to:

$$r = \frac{\Sigma_{i=1}^{n}(x_i - \bar{x})(y_i - \bar{y})}{\sqrt{\Sigma_{i=1}^{n}(x_i - \bar{x})^2}\sqrt{\Sigma_{i=1}^{n}(y_i - \bar{y})^2}}$$

where x is an image pixel for a first image, a first image mask or a first masked image; y is an image pixel for a second image, a second image mask or a second masked image; $\bar{x}$ is average pixel value for the first image, the first image mask or the first masked image; and $\bar{y}$ is average pixel value for the second image, the second image mask or the second masked image.

In other embodiments, the integrated circuit device is programmed to calculate the co-localization coefficient for the feature of the cell according to:

$$r = \frac{\sum_{i=1}^{n}(x_i y_i) - n\overline{x}\overline{y}}{\sqrt{\sum_{i=1}^{n}(x_i^2) - n\overline{x}^2}\sqrt{\sum_{i=1}^{n}(y_i^2) - n\overline{y}^2}}$$

In still other embodiments, the integrated circuit device is programmed to calculate the co-localization coefficient for the feature of the cell according to:

$$\log r = \log(\Sigma_{i=1}^{n}(x_i y_i) - n\overline{xy}) - 0.5*\log(\Sigma_{i=1}^{n}(x_i^2) - n\overline{x}^2) - 0.5*\log(\Sigma_{i=1}^{n}(y_i^2) - n\overline{y}^2)$$

Kits

Aspects of the present disclosure further include kits, where kits include one or more of the integrated circuit devices described herein. In some embodiments, kits may further include programming for the subject systems, such as in the form of a computer readable medium (e.g., flash drive, USB storage, compact disk, DVD, Blu-ray disk, etc.) or instructions for downloading the programming from an internet web protocol or cloud server. Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods and computer systems find use in a variety of applications where it is desirable to analyze and sort particle components in a sample in a fluid medium, such as a biological sample. In some embodiments, the systems and methods described herein find use in flow cytometry characterization of biological samples labelled with fluorescent tags. In other embodiments, the systems and methods find use in spectroscopy of emitted light. In addition, the subject systems and methods find use in increasing the obtainable signal from light collected from a sample (e.g., in a flow stream). In certain instances, the present disclosure finds use in enhancing measurement of light collected from a sample that is irradiated in a flow stream in a flow cytometer. Embodiments of the present disclosure find use where it is desirable to provide a flow cytometer with improved cell sorting accuracy, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for sorting cells of a sample, the method comprising:
    detecting light from a sample comprising cells in a flow stream;
    generating binary image masks of cells in the flow stream by comparing each pixel from a greyscale image of each cell against a determined threshold value and converting each pixel to a binary pixel value; and
    sorting cells of the sample by generating droplets containing the cells and separating the droplets into two or more separated sample collection containers based on the generated image mask.

2. The method according to claim 1, wherein detecting light from the sample in the flow stream comprises light absorption, light scatter, fluorescence or a combination thereof.

3. The method according to claim 1, wherein generating the image mask comprises generating a greyscale image of the cell in the flow stream.

4. The method according to claim 3, further comprising determining a pixel intensity threshold value from the greyscale image.

5. The method according to claim 1, wherein the method comprises:
detecting light absorption from the flow stream; and
assigning a pixel value of 1 to each pixel in the greyscale image when the pixel intensity is less than the threshold value and assigning a pixel value of 0 when the pixel intensity of the greyscale image is greater than the threshold value.

6. The method according to claim 5, further comprising determining across a horizontal row of the greyscale image a first pixel and a second pixel having an assigned pixel value of 1.

7. The method according to claim 6, wherein the first pixel is the first pixel across the horizontal row having a pixel value of 1.

8. The method according to claim 6, wherein the second pixel is the last pixel across the horizontal row having a pixel value of 1.

9. The method according to claim 1, wherein the method comprises:
detecting light scatter from the cell in the flow stream; and
assigning a pixel value of 1 to each pixel in the greyscale image when the pixel intensity is greater than the threshold value and assigning a pixel value of 0 when the pixel intensity is less than the threshold value.

10. The method according to claim 1, wherein the method comprises:
detecting fluorescence from the cell in the flow stream; and
assigning a pixel value of 1 to each pixel in the greyscale image when the pixel intensity is greater than the threshold value and assigning a pixel value of 0 when the pixel intensity is less than the threshold value.

11. The method according to claim 9, wherein the method comprises comparing across a horizontal row each pixel intensity value of the greyscale image against the determined threshold value.

12. The method according to claim 1, wherein the image mask comprises pixels having a pixel value of 1.

13. The method according to claim 1, further comprising determining the size of the cell based on the image mask.

14. The method according to claim 1, further comprising determining the center of mass of the cell based on the image mask.

15. The method according to claim 14, further comprising determining the eccentricity of the cell based on the image mask.

16. The method according to claim 1, further comprising generating a second image mask of the cell.

17. The method according to claim 16, further comprising comparing the first image mask with the second image mask of the cell.

18. The method according to claim 17, further comprising determining that the image mask of the cell comprises a doublet.

19. The method according to claim 1, further comprising generating an image of the cell.

\* \* \* \* \*